United States Patent [19]

Kimura et al.

[11] Patent Number: 5,161,151
[45] Date of Patent: Nov. 3, 1992

[54] SYSTEM AND METHOD FOR CONTROLLING MULTIPLEX COMMUNICATIONS BETWEEN MASTER STATION AND SLAVE STATIONS

[75] Inventors: Takashi Kimura; Keiji Nomura, both of Kanagawa, Japan

[73] Assignee: Nissan Motor Company, Limited, Japan

[21] Appl. No.: 649,834

[22] Filed: Feb. 5, 1991

[30] Foreign Application Priority Data

Feb. 6, 1990 [JP] Japan ................................. 2-25051

[51] Int. Cl.⁵ .............................................. H04J 3/14
[52] U.S. Cl. ......................................... 370/13; 370/14; 370/85.8; 370/95.2; 371/20.1; 371/20.3; 371/20.4; 340/825.08
[58] Field of Search ........................ 370/13, 14, 15, 16, 370/85.8, 95.2; 371/20.1, 20.3, 20.4, 20.6; 340/825.08

[56] References Cited

U.S. PATENT DOCUMENTS 4,506,357 3/1985 Nakayashiki et al. ................. 370/16
4,910,733 3/1990 Sommani et al. .................... 370/85.1

FOREIGN PATENT DOCUMENTS 816972 7/1959 United Kingdom .
1485117 9/1977 United Kingdom .

OTHER PUBLICATIONS

US Book: Dixon R. Doll: Date1 Communication, Wiley-Interscience Publication, John Wiley & Son, New York Chapter 8 "Line Control Procedures, Network Protocols, and Control Software", 8.1 through 8.2.4.

Primary Examiner—Douglas W. Olms
Assistant Examiner—Russell W. Blum
Attorney, Agent, or Firm—Lowe, Price, LeBlanc & Becker

[57] ABSTRACT

A system and method for controlling multiplex communication between a master station and a plurality of slave stations, in which a predetermined signal (dummy signal) is transmitted to the plurality of slave stations via a communication circuit (serial bus) from the master station when the master station does not communicate with any one of the slave stations. The predetermined signal indicates that the master station is operating normally, and each slave station receives the predetermined signal derived from the master station via the communication circuit so that each slave station may determine that the master station and communication circuit are operating normally.

15 Claims, 4 Drawing Sheets

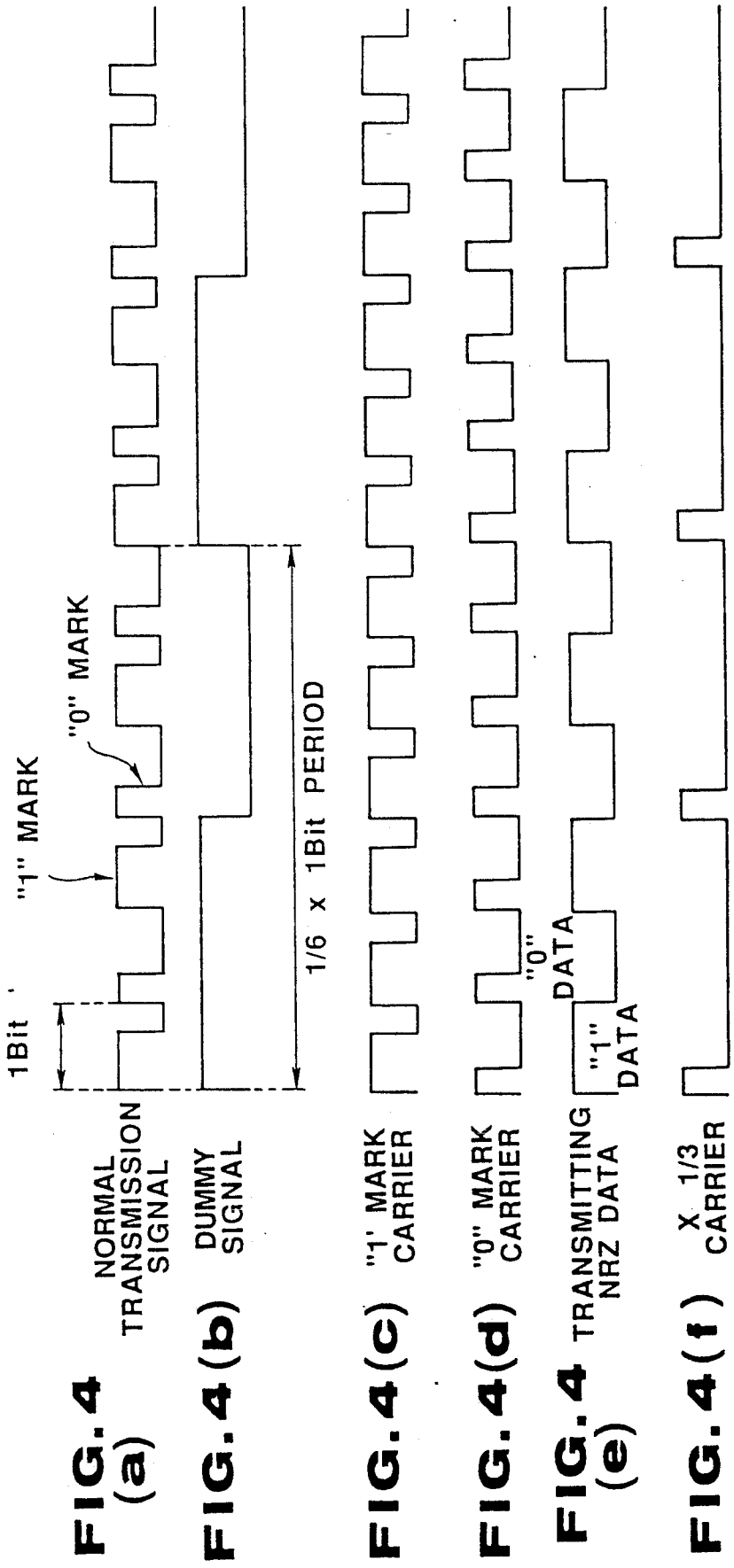

SYSTEM AND METHOD FOR CONTROLLING MULTIPLEX COMMUNICATIONS BETWEEN MASTER STATION AND SLAVE STATIONS

BACKGROUND OF THE INVENTION

1. Field of the Invention

The present invention relates generally to a system and method for controlling time-division multiplex communications between a master station and a number of slave stations. A polling method is adopted in which a response is returned from one slave station to a master station in response to a que issued from the master station to the slave station in a communication system established between the master station and a plurality of slave stations connected via a communication circuit, and which are applicable to a multiple network, e.g., installed in an automotive vehicle. More particularly, the present invention relates to a system and method for controlling the multiplex communication which supervises a state of the communication and the master station at one of the slave stations.

2. Description of the background art

Various types of multiplex communication control systems have been proposed.

For example, one of the previously proposed communication control systems includes a master station and a plurality of slave stations, the master station being connected to the slave stations via a serial bus which serves as a communication circuit so that the master station can communicate with each slave station. Specifically, the master station requests one of the slave stations to transmit data input into the requested slave station to the master station in response to a request from the master station. Thereafter, the master station processes the output data for transmission to one of the slave stations selected by the master station.

If the master station fails, or if an abnormality occurs such as a breakage in the serial bus, the slave station detects the abnormality in the master station and/or in the serial bus and, in a case where the output data of the slave station controls is used to control equipment, it is necessary to activate a fail-safe device so as not erroneously operate the equipment.

The master station includes a transmission/reception circuit to communicate with each slave station and a microcomputer for controlling the transmission/reception operations to or from each slave station via the transmission/reception circuit. Each slave station includes a transmission/reception circuit for communicating with the master station and a master station monitoring circuit for monitoring the state of the master station and the serial bus. The circuit for master station monitoring includes a signal detection circuit for detecting a communication signal always transmitted from the master station when the master station operates normally, a counter resettable by means of an output signal derived from the signal detection circuit, and a register including, e.g., a flip-flop circuit (FF) which supplies a low-level output signal to the master station monitoring circuit as the master station monitor error signal.

An operation of the previously proposed multiplex communication control system will be described below.

If the master station operates normally, a communication signal is transmitted via the serial bus from a transmission/reception circuit under control of the microcomputer. In the slave stations, a signal detection circuit of the master station monitoring circuit detects the communication signal and outputs a detection signal representing a change point of the communication signal detected by the signal detection circuit. A detection signal output from the signal detection circuit is supplied to a counter and register. The detection signal is used to reset the counter and to set the register. Consequently, if the master station operates normally and the communication signal is always transmitted, the counter is always reset in response to the detection signal derived from the signal detection circuit. Since a carry signal is not output from the counter, the register is not reset. Since the register is continually reset in response to the detection signal from the signal detection circuit, the register does not output the low level master station monitoring error signal.

On the other hand, suppose that the master station fails or the serial bus operates in an abnormal state. In this case, the signal detection circuit of the master station monitoring circuit cannot detect the communication signal. Therefore, the register is not set and the counter is not reset. Consequently, the counter outputs a carry signal after the counting operation is ended for a predetermined period of time so that the register is reset. Then, the register outputs the low level master station monitoring error signal. The error signal is supplied to the transmission/reception circuit. Consequently, the transmission/reception circuit fixes the output data in a safety mode. It is noted that the predetermined period of time during which the counter counts is selected to be several times a normal communication frame period.

If the problem is corrected and communication signal transmission is resumed from the master station, the communication signal is detected at the slave station by means of the signal detection circuit of the master station monitoring circuit provided for each slave station. The detection signal is used to reset the counter. The register, therefore, is set. Since the master station monitoring error signal is eliminated from the register, the respective slave stations can recognize that communication has returned to its normal state.

However, a problem arises in the previously proposed communication control system.

That is to say, since the master station monitoring circuit of each slave station always monitors a state of the serial bus, it is necessary for the master station to always transmit the communication signal to the serial bus. Consequently, since it is necessary for the microcomputer of the master station to activate the transmission/reception circuit of the master station at constant intervals, the microcomputer is compelled to carry out interrupt processing at those intervals. Therefore, the microcomputer receives a burden in view of its software in a case where another task is being executed and communication control and slave station control must also be carried out. Consequently, a time required for the microcomputer to carry out a given task becomes longer.

SUMMARY OF THE INVENTION

It is, therefore, an object of the present invention to provide a time-division multiplex communication control system and method in which a software burden in a microcomputer of a master station can be relieved and efficient tasking can be achieved.

The above-described object can be achieved by providing a system for controlling multiplex communication between a master station and a plurality of slave stations, comprising: a) first means, installed in the master station, for transmitting a predetermined signal indicating that the master station is operating normally to each slave station via a communication circuit when no communication between the master station and any one of the slave stations is carried out; b) second means, installed in each slave station, for receiving the predetermined signal from the master station via the communication circuit and determining that the master station and communication circuit are normal when the predetermined signal is received.

The above-described object can also be achieved by providing a system for controlling communication between a master station and a plurality of slave stations, comprising: a) first means for transmitting a predetermined signal to each of the slave stations from the master station via a communication circuit connecting the master station to the plurality of slave stations when the master station is not in communication with any one of the plurality of slave stations, the predetermined signal indicating that the master station operates normally; and b) second means for monitoring a status of the master station on the basis of the predetermined signal derived from the master station via the communication circuit and determining that the master station and/or communication circuit has failed when no predetermined signal is received.

The above-described object can also be achieved by providing a method for controlling communication between a master station and a plurality of slave stations, comprising the steps of: a) transmitting from the master station a predetermined signal indicating that the master station is operating normally to each slave station via a communication circuit when no communication between the master station and any one of the slave stations is carried out; b) receiving at each slave station, via the communication circuit, the predetermined signal from the master station and determining that the master station and communication circuit are normal when the predetermined signal is received.

BRIEF DESCRIPTION OF THE DRAWING

FIGS. 4(a)-(f) is a waveform chart for explaining the operation of the multiplex communication control system shown in FIG. 1.

DETAILED DESCRIPTION OF THE PREFERRED EMBODIMENT

Reference will hereinafter be made to the drawings in order to facilitate a better understanding of the present invention.

Figure 1:
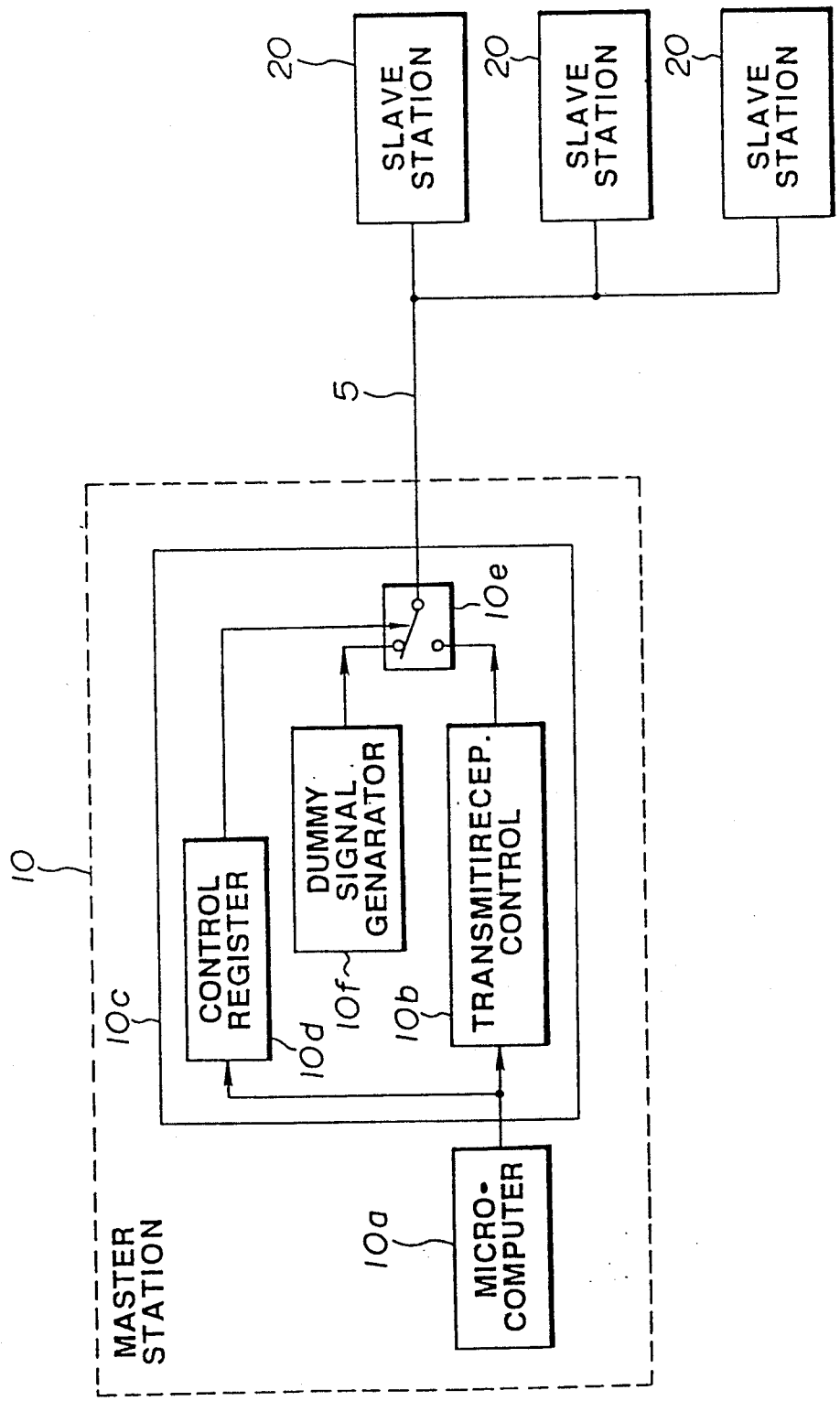
FIG. 1 is a schematic block diagram of a multiplex communication control system in a preferred embodiment according to the present invention.

FIG. 1 shows a block diagram of a multiplex communication control system of a preferred embodiment according to the present invention.

In FIG. 1, a master station 10 is connected to a plurality of slave stations via a serial bus 5 so that the master station 10 can be communicated with each slave station 20.

The master station 10 includes a microcomputer 10a and a transmission/reception circuit 10c for controlling operations, including communication to each slave station 20. The transmission/reception circuit 10c includes a transmission/reception control circuit 10b for carrying out communication for each slave station 20, a dummy signal generation circuit 10f for generating a dummy signal indicating that the master station 10 operates normally, a switch 10e for connection the serial bus 5 with either the transmission/reception control circuit 10b or dummy signal generation circuit 10f, and a control register 10d for controlling the switch 10e.

Figure 2:
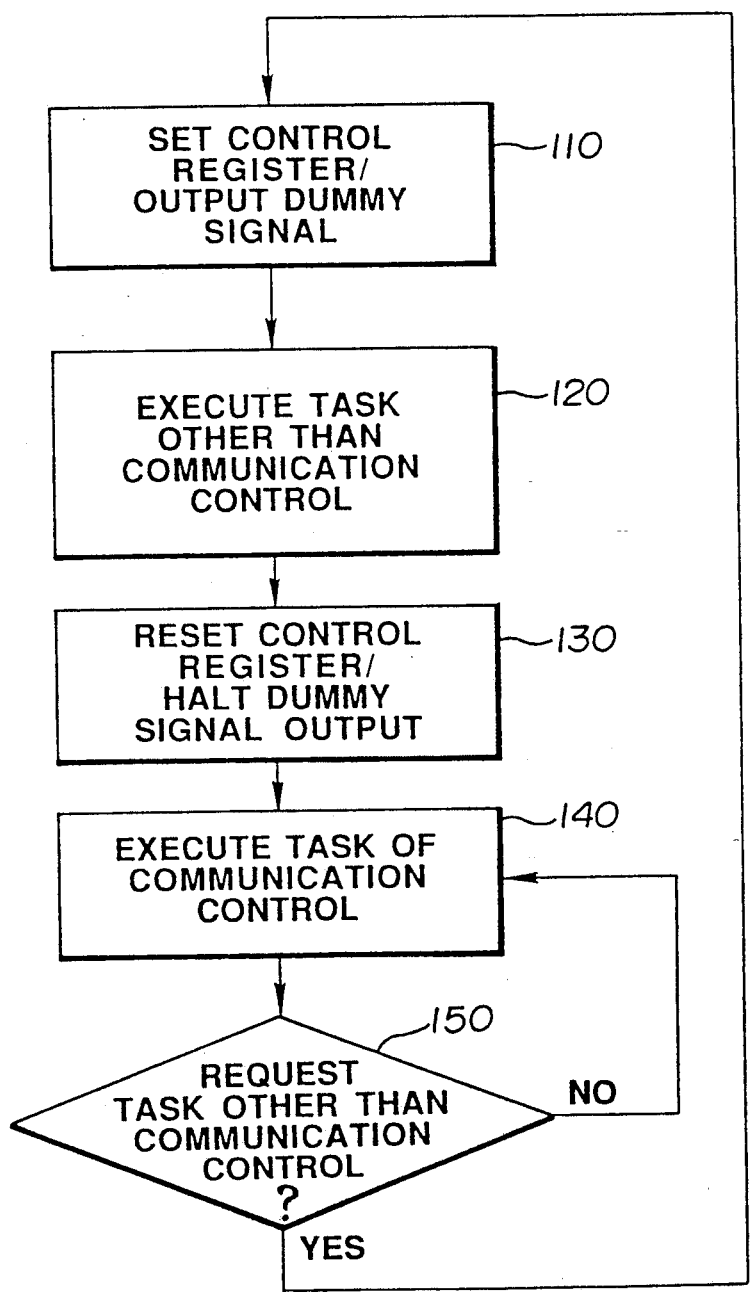
FIG. 2 is an operational flowchart of the multiplex communication control circuit shown in FIG. 1.

FIG. 2 shows an operational flowchart for explaining an operation of the multiplex communication control system described with reference to FIG. 1.

If the microcomputer 10a of the master station 10 executes an operation other than a communication task, a control bit of the control register 10d is set to control the switch 10e so that the dummy signal generator 10f is connected to a serial bus 5.

Consequently, the dummy signal from the dummy signal generator 10f is transmitted to one of the slave stations 20 via the serial bus 5 (step 110). The slave station 20 receives the dummy signal to determine that the serial bus 5 is normal. It is noted that since only the communication signal is output from the dummy signal generation circuit 10f, a slave station 20 connected to the serial bus 5 will not respond to the dummy signal. The master station monitoring circuit within the slave station 20 can thus confirm that the master station 10 operates normally if the dummy signal is output and can confirm that no abnormality is present in the serial bus 5.

If the master station 10 executes a task other than communication control (step 120). When the task is ended, the master station 10 resets a control bit of the control register 10d to halt the output of the dummy signal (step 130). Thereafter, the task of communication control with each slave station 20 is executed (step 140). If the task of communication control is ended, the master station 10 checks to see if a task other than communication control has been requested (step 150). In a case where a task other than communication control is requested, the routine goes to a step 110 in which the dummy signal is output as described above. Then, the other task is executed. In the case of the communication control task, the routine goes to a step 140 in which the task on the communication control is executed.

Figure 3:
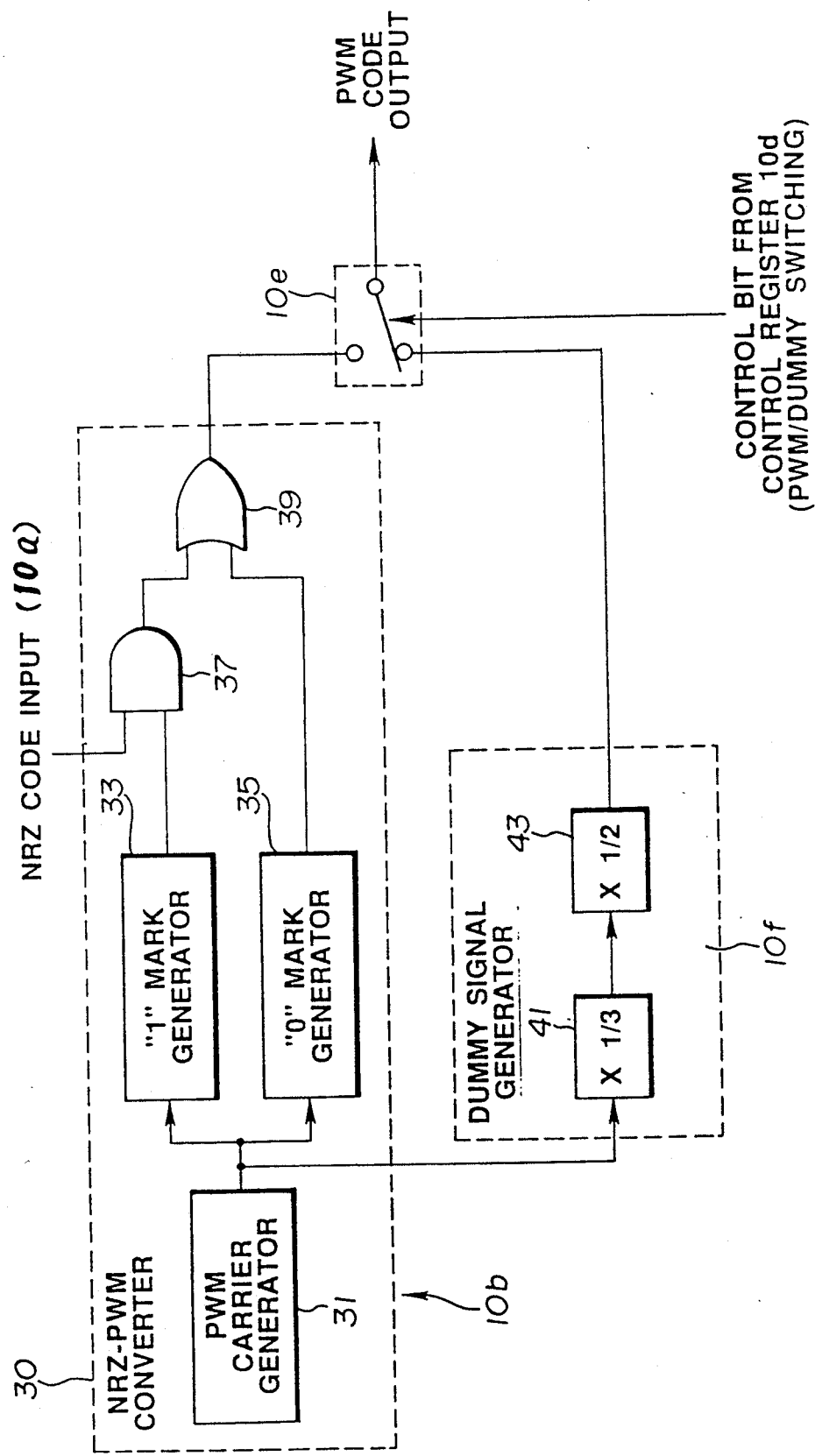
FIG. 3 is a schematic circuit block diagram of an essential circuit used in the multiplex communication system shown in FIG. 1.

FIG. 3 shows a detailed circuit structure of an NRZ-PWM conversion circuit 30 which is installed in the dummy signal generation circuit 10f and transmission/reception control circuit 10b used in the multiplex communication control system shown in FIG. 1.

The NRZ-PWM (Non-Return to Zero to Pulse Width Modulation) conversion circuit 30 generates a transmission signal to be transmitted according to an NRZ-PWM method.

FIG. 4 shows a timing chart of waveforms of each part of the NRZ-PWM conversion circuit shown in FIG. 3.

The transmission signal to be transmitted from the NRZ-PWM conversion circuit 30 constitutes a message of a code of 1 and code 0 as appreciated from FIG. 4 (a) such that the code 1 and code 0 are closely transmitted.

In addition, it is noted that as shown in FIG. 4 (a), the code 1 has a relatively long pulsewidth per bit period and the code 0 has a relatively short pulsewidth per bit period.

The dummy signal transmitted from the dummy signal generation circuit 10f is such as to have a transmission waveform several times longer than a bit period of the normal transmission signal shown in FIG. 4(a), as appreciated from FIG. 4(b). Therefore, the slave stations do not erroneously receive the dummy signal and radiating noise can be suppressed to a lower level.

The NRZ-PWM conversion circuit 30 includes a PWM carrier generation circuit 31 which generates a reference clock of the PWM carrier; a 1 mark generator 33 which generates a 1 mark carrier as shown in FIG. 4(c); a 0 mark carrier generator 35 which generates a 0 mark carrier as shown in FIG. 4(d) on the basis of a reference signal derived from the PWM carrier generation circuit 31; an AND gate circuit 37 having one input end receiving transmission NRZ data as shown in FIG. 4(e), that is, data to be transmitted in the NRZ form, another input end receiving a 1 mark carrier output from the 1 mark generator 33, and an output end outputting a product result of the input signals; and an OR gate circuit which carries out an OR calculation of both the output signal from the AND gate circuit 37 and 0 mark carrier output from the 0 mark carrier generator 35 and which outputs a transmission signal in PWM form as shown in FIG. 4(d) and which supplies the transmission signal to one of switching terminals of the switch 10e.

In addition, the dummy signal generation circuit 10f includes a ⅓ frequency divider 41 which carries out a frequency division of ⅓ of a reference clock output from the PWM carrier generation circuit 31 and which generates ⅓ carrier shown in FIG. 4 (f); and a ½ frequency divider 43 which furthermore carries out a ½ frequency division of the ⅓ frequency divided carrier output from the ⅓ frequency divider 41, which generates the dummy signal shown in FIG. 4 (b), and which supplies the dummy signal shown in FIG. 4 (b) to the other switching terminal of the dummy signal generation circuit 10f.

The switch 10e is controlled in accordance with a switching signal to select the PWM transmission signal/dummy signal and constituted by a control bit from the control register 10d in the same way as described with reference to FIG. 1. Thus, in a case where the microcomputer 10a of the master station 10 carries out a task other than communication control and/or slave station control, the switch 10e is switched to the dummy signal generator 10f so that the dummy signal is transmitted to the serial bus 5 via the switch 10e and is transmitted from the serial bus to any one of the slave stations. In a case where the microcomputer 10a of the master station 10 carries out a communication task, the switch 10e is switched to the NRZ-PWM conversion circuit 30. Thus, the PWM transmission signal output from the OR gate circuit 39 of the NRZ-PWM conversion circuit 30 is transmitted to the serial bus 5 via the switch 10e and is transmitted from the serial bus 5 to the slave stations. Each slave station 20 can recognize that the master station 10 and serial bus 5 operate normally.

As described hereinabove, according to the present invention the transmission circuit means installed in the master station transmits a predetermined signal indicating that the master station and serial bus are operating normally to each slave station via the communication circuit in a case where no communication between the master station and slave station is carried out. Since the received predetermined signal is used to determine whether both master station and communication circuit are normal, the microcomputer which is the control system of the master station is not needed to transmit the signal at each constant time interval. Consequently, a load on the software of the microcomputer can be relieved and the performance of the microcomputer can be considerably enhanced, especially, when the microcomputer is reset and started, it is very effective if the initialization execution time is long.

It will fully be appreciated by those skilled in the art that the foregoing description has been made in terms of the preferred embodiment and various changes and modifications may be made without departing from the scope of the present invention which is to be defined by the appended claims.

What is claimed is:

1. A system for controlling multiplex communication between a master station and a plurality of slave stations using a polling protocol, comprising:
   a) first means, installed in the master station, for transmitting a predetermined signal indicating that the master station is operating normally to each slave station via a communication circuit while no communication between the master station and any one of the slave stations is carried out; and
   b) second means, installed in each slave station, for receiving the predetermined signal from the master station via the communication circuit and determining that the master station and communication circuit are normal when the predetermined signal is received.

2. A system as set forth in claim 1, which further includes third means, installed in the master station, for communicating data between the master station and any one of the slave stations via the communication circuit when the first means is inactive.

3. A system as set forth in claim 2, which further includes fourth means, installed in each slave station, for transmitting and receiving data to and from the master station.

4. A system as set forth in claim 3, wherein the master station includes a microcomputer and a transmission/reception control circuit and wherein the first means includes a dummy signal generation circuit for generating and outputting the predetermined signal indicating that the master station operates normally, a switch for selecting either the transmission/reception control circuit or the dummy signal generation circuit for connection to a serial bus constituting the communication circuit, and a control register controlling the selection of the switch.

5. A system as set forth in claim 4, wherein the microcomputer executes a task other than communication control when the dummy signal is output from the dummy signal generation circuit to the serial bus.

6. A system as set forth in claim 5, wherein the microcomputer resets a control bit of the control register to halt the output of the dummy signal when execution of the task other than communication control is ended.

7. A system as set forth in claim 6, wherein the microcomputer executes a communication control task when the output of the dummy signal is halted.

8. A system as set forth in claim 7, wherein the microcomputer checks to see if a task other than communication control is requested and executes the task if a request is present while the dummy signal is output to the serial bus from the dummy signal generation circuit.

9. A system as set forth in claim 8, wherein the transmission/reception control circuit includes a PWM (Pulse Width Modulation) carrier generator which generates a reference clock for a PWM carrier; a 1 mark generator which generates a 1 mark carrier signal on the basis of the reference clock derived from the PWM carrier generator; a 0 mark generator which generates an 0 mark carrier signal on the basis of the reference clock of the PWM carrier; an AND gate circuit which provides a product of both the 1 mark carrier and an NRZ (Non-Return To Zero) data derived from the microcomputer; and an OR gate circuit which provides a logical OR of both the 0 mark carrier derived from the 0 mark carrier generator and output data from the AND gate circuit, to be transmitted to any one of the slave stations, the output terminal of the OR gate circuit being connected to the switch.

10. A system as set forth in claim 9, wherein the dummy signal generation circuit includes a $\frac{1}{3}$ frequency division circuit for frequency dividing the frequency of the input reference clock derived from the PWM carrier generator by $\frac{1}{3}$, and a $\frac{1}{2}$ frequency division circuit for dividing by $\frac{1}{2}$ a frequency output signal derived from the $\frac{1}{3}$ frequency division circuit, an output signal from the $\frac{1}{2}$ frequency division circuit being supplied to the switch as the dummy signal.

11. A system as set forth in claim 10, wherein the second means installed in each slave station includes a signal detection circuit for detecting the dummy signal on the serial bus and outputting a second predetermined signal when detecting the dummy signal; a counter for freely counting the number of clock pulses for a predetermined time and outputting a carry signal whenever the counted number reaches a predetermined number, the counter being connected to receive the second predetermined signal and being reset in response thereto; a flip-flop circuit connected to receive the second predetermined signal and being set in response thereto, the flip-flop circuit connected to receive the carry signal from the counter and outputting to the serial bus a third predetermined signal when it is reset in response to the carry signal derived from the counter, the third predetermined signal indicating that the master station and/or serial bus is in an abnormal state.

12. A system as set forth in claim 11, wherein a control bit from the control register is used to select the output signal derived from the OR gate circuit of the NRZ-PWM conversion circuit constituting the transmission/reception control circuit of the master station or the dummy signal derived from the dummy signal generator of the master station.

13. A system for controlling communication between a master station and a plurality of slave stations, using a polling protocol comprising:
a) first means, installed in the master station, for transmitting a predetermined signal to each of the slave stations from the master station via a communication circuit connecting the master station to the plurality of slave stations while the master station is not in communication with any one of the plurality of slave stations, the predetermined signal indicating that the master station operates normally; and
b) second means, installed in each slave station, for monitoring a status of the master station on the basis of the predetermined signal derived from the master station via the communication circuit and determining that the master station and/or communication circuit has failed when no predetermined signal is received.

14. A method for controlling communication between a master station and a plurality of slave stations, comprising the steps of:
a) transmitting from the master station a predetermined signal indicating that the master station is operating normally to each slave station via a communication circuit when no communication between the master station and any one of the slave stations is carried out;
b) receiving at each slave station, via the communication circuit, the predetermined signal from the master station and determining that the master station and communication circuit are normal when the predetermined signal is received.

15. A system for controlling a multiplex transmission using a polling method in which any one of a plurality of slave stations issues a reply in response to a que issued from a master station, comprising:
a supervisor circuit, installed in each slave station, for monitoring a normal operation of the master station and/or normal condition of a transmission line extended between the master station and each of the slave stations;
a control microcomputer installed in the master station; and
a multiplex communication circuit installed in the master station,
said multiplex communication circuit having a function to transmit to the transmission line a pseudo signal which serves to be recognized that the operation of the master station and the condition of the transmission line are in a normal state by means of the supervisor circuit in response to a command issued from the microcomputer, in a case when the control microcomputer executes a program other than that for the microcomputer to execute the communication control to any one of the slave stations.

* * * * *